United States Patent
Alon et al.

(10) Patent No.: US 8,543,755 B2
(45) Date of Patent: Sep. 24, 2013

(54) MITIGATION OF EMBEDDED CONTROLLER STARVATION IN REAL-TIME SHARED SPI FLASH ARCHITECTURE

(75) Inventors: Moshe Alon, Tel Aviv (IL); Ilia Stolov, Holon (IL); Erez Naory, Ra'anana (IL); Nir Tasher, Tel-Mond (IL); Yuval Kirschner, Even Yehuda (IL); Michal Schramm, Tel Aviv (IL)

(73) Assignee: Nuvoton Technology Corporation, Hsin-Chu (TW)

( * ) Notice: Subject to any disclaimer, the term of this patent is extended or adjusted under 35 U.S.C. 154(b) by 30 days.

(21) Appl. No.: 13/360,746

(22) Filed: Jan. 29, 2012

(65) Prior Publication Data

US 2012/0239848 A1   Sep. 20, 2012

Related U.S. Application Data

(60) Provisional application No. 61/452,654, filed on Mar. 15, 2011.

(51) Int. Cl.
*G06F 13/36* (2006.01)

(52) U.S. Cl.
USPC .......................................... 710/311; 718/104

(58) Field of Classification Search
USPC ................ 710/309–315, 306; 711/117–118, 711/141; 718/100–104
See application file for complete search history.

(56) References Cited

U.S. PATENT DOCUMENTS

| | | | |
|---|---|---|---|
| 6,687,903 | B1 | 2/2004 | Chalmer et al. |
| 7,730,265 | B1 | 6/2010 | Cypher et al. |
| 7,818,529 | B2 | 10/2010 | Hou |
| 7,930,576 | B2 | 4/2011 | Harris et al. |
| 2013/0021352 | A1 | 1/2013 | Wyatt et al. |

OTHER PUBLICATIONS

Winbond Electronics Corp., "Spiflash-16-Mbit, 32-Mbit and 64-Mbit Serial Flash Memory with 4KB Sectors and Dual Output SPI," Revision 1, May 5, 2008.
U.S. Appl. No. 13/236,673, filed Sep. 20, 2011.
U.S. Appl. No. 13/236,673 Office Action dated Jun. 24, 2013.

*Primary Examiner* — Clifford Knoll
(74) *Attorney, Agent, or Firm* — D. Kliger I.P. Services Ltd.

(57) ABSTRACT

An embedded controller includes a microcontroller core, a first bus interface that does not support bus arbitration, a second bus interface and memory control circuitry. The first bus interface is configured to receive and transmit memory transactions from and to a Central Processing Unit (CPU) chipset. The second bus interface is configured to communicate with a memory and to transfer the memory transactions of the CPU chipset to and from the memory. The memory control circuitry is configured to evaluate a starvation condition that identifies an inability of the microcontroller core to access the memory via the second bus interface due to the memory transactions transferred between the CPU chipset and the memory via the first and second bus interfaces, and to invoke a predefined corrective action when the starvation condition is met.

27 Claims, 2 Drawing Sheets

MITIGATION OF EMBEDDED CONTROLLER STARVATION IN REAL-TIME SHARED SPI FLASH ARCHITECTURE

CROSS-REFERENCE TO RELATED APPLICATIONS

This application claims the benefit of U.S. Provisional Patent Application 61/452,654, filed Mar. 15, 2011, whose disclosure is incorporated herein by reference.

FIELD OF THE INVENTION

The present invention relates generally to computer architecture, and particularly to memory sharing between an embedded controller and a central processing unit.

BACKGROUND OF THE INVENTION

Various techniques are known in the art for sharing memory resources between processors. For example, U.S. Pat. No. 7,818,529, whose disclosure is incorporated herein by reference, describes an integrated memory control apparatus including a first interface decoder, a second interface decoder and an interface controller. The first interface decoder is coupled to a control chip through a first Serial Peripheral Interface (SPI), the second interface decoder is coupled to a microprocessor unit through a general transmission interface, and the interface controller is coupled to a memory through a second SPI. When the interface controller receives the request signals from the control chip and the microprocessor unit, the control chip may correctly read data from the memory through the first and second SPI. On the other hand, the microprocessor unit may stop reading data from the memory through the general transmission interface. Therefore, the control chip and the microprocessor unit can share the same memory.

SUMMARY OF THE INVENTION

An embodiment of the present invention that is described herein provides an embedded controller including a microcontroller core, a first bus interface that does not support bus arbitration, a second bus interface and memory control circuitry. The first bus interface is configured to receive and transmit memory transactions from and to a Central Processing Unit (CPU) chipset. The second bus interface is configured to communicate with a memory and to transfer the memory transactions of the CPU chipset to and from the memory. The memory control circuitry is configured to evaluate a starvation condition that identifies an inability of the microcontroller core to access the memory via the second bus interface due to the memory transactions transferred between the CPU chipset and the memory via the first and second bus interfaces, and to invoke a predefined corrective action when the starvation condition is met.

In other embodiments, the memory control circuitry is configured to evaluate the starvation condition by detecting that no successful fetch transactions occur between the microcontroller core and the memory within a predetermined time period.

In other embodiments, the memory control circuitry is configured to evaluate the starvation condition by detecting that a number of successful fetch transactions, initiated by the microcontroller core to the memory over the second bus interface, is below a predetermined threshold. In yet another embodiment, the memory control circuitry is configured to evaluate the starvation condition by detecting that the microcontroller core fails to access the memory within a predetermined time period. In other embodiments, the memory control circuitry is configured to evaluate the starvation condition by estimating an average length of fetch transactions between the microcontroller core and the memory.

In some embodiments, the embedded controller includes a watchdog circuit that is configured to monitor an expected progress of software executed by the microcontroller core, and the memory control circuitry is configured to evaluate the starvation condition by detecting a deviation from the expected progress using the watchdog circuit.

In other embodiments, the microcontroller core includes a cache memory for caching memory access operations between the microcontroller core and the memory, and the memory control circuitry is configured to evaluate the starvation condition based only on the memory access operations that are not served from the cache memory.

In another embodiment, the memory control circuitry is configured to assign to the inability of the microcontroller core to access the memory a starvation severity level, selected from a set of multiple different severity levels, and to invoke the predefined corrective action depending on the assigned starvation severity level.

In some embodiments, the memory control circuitry is configured to invoke the corrective action by initiating a shut-down of a computer that comprises the embedded controller and the CPU chipset. In other embodiments, the memory control circuitry is configured to the initiate computer shut-down without prior notification to the CPU chipset. In yet another embodiment, the memory control circuitry is configured to request software running on the CPU of the computer to shut-down the computer.

In some embodiments, the microcontroller core is configured to invoke the corrective action by switching to run the embedded controller using emergency software code that is not fetched in real time from the memory over the second bus interface. In other embodiments, the embedded controller includes an additional microcontroller core that is configured to execute the emergency software code in response to detection of the starvation condition.

There is additionally provided, in accordance with an embodiment of the present invention, a method that includes receiving and transmitting, in an embedded controller, memory transactions from and to a Central Processing Unit (CPU) chipset over a first bus interface that does not support bus arbitration, and communicating with a memory and transferring the memory transactions of the CPU chipset to and from the memory over a second bus interface. A starvation condition is evaluated that identifies an inability of the embedded controller to access the memory via the second bus interface due to the memory transactions transferred between the CPU chipset and the memory via the first and second bus interfaces. A predefined corrective action is invoked when the starvation condition is met.

There is also provided, in accordance with an embodiment of the present invention, a computer that includes a Central Processing Unit (CPU) chipset, a memory, and an embedded controller. The embedded controller includes a microcontroller core, a first bus interface, which does not support bus arbitration and is configured to receive and transmit memory transactions from and to the CPU chipset, a second bus interface, which is configured to communicate with the memory and to transfer the memory transactions of the CPU chipset to and from the memory, and memory control circuitry. The memory control circuitry is configured to evaluate a starvation condition that identifies an inability of the microcontroller core to access the memory via the second bus interface due to the memory transactions transferred between the CPU chipset and the memory via the first and second bus interfaces, and to invoke a predefined corrective action when the starvation condition is met.

The present invention will be more fully understood from the following detailed description of the embodiments thereof, taken together with the drawings in which:

DETAILED DESCRIPTION OF EMBODIMENTS

Overview

Figure 1:
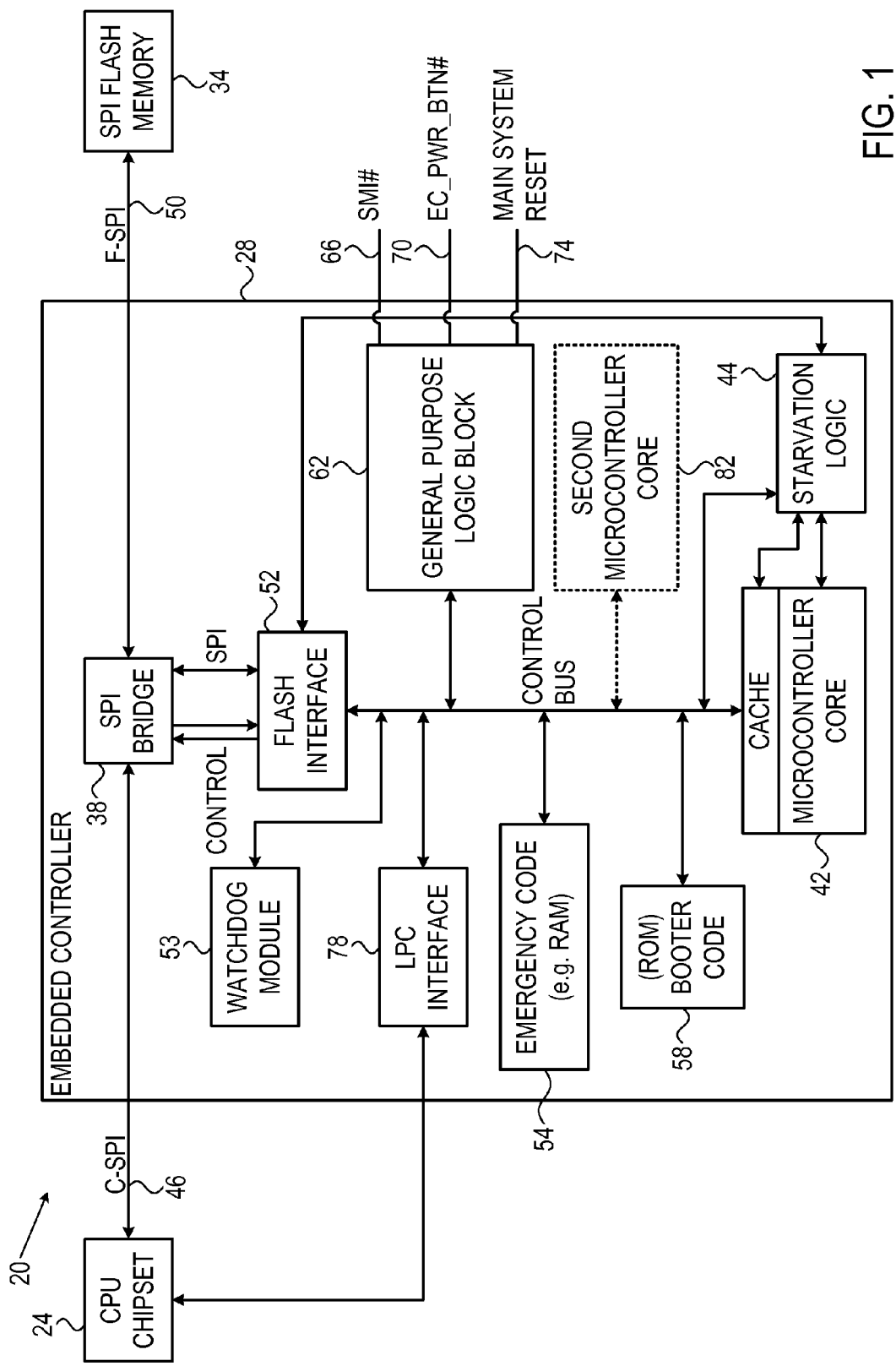
FIG. 1 is a block diagram that schematically illustrates elements of a computer, in accordance with an embodiment of the present invention.

In some computer architectures, an Embedded Controller (EC) carries out various system functions such as keyboard scanning, power management, battery charging and fan control. Embodiments of the present invention that are described herein provide improved EC configurations. In some embodiments, a computer comprises a memory that is shared between an EC and a Central Processing Unit (CPU) chipset. The EC communicates with the memory through a first bus interface. The CPU chipset communicates with the memory through a second bus interface to the EC and then through the first bus interface with the memory. The EC comprises a microcontroller core and memory control circuitry, e.g., a bridge sub-circuit, which allows either the EC microcontroller core or the CPU chipset to fetch data from the memory. Certain aspects of this configuration are addressed in U.S. patent application Ser. No. 13/236,673, filed Sep. 20, 2011, whose disclosure is incorporated herein by reference.

The above-described shared memory configuration eliminates the need to maintain separate memories for both the EC and CPU chipset. For example, such a configuration enables storing the EC program code in the shared memory rather than in an internal memory of the EC, such that the EC fetches and executes the program code from the shared memory in real time. Sharing memory resources between the EC and CPU chipset reduces cost and power consumption of the EC and of the computer as a whole. This configuration may also reduce component count and simplify the overall computer configuration.

In this configuration, the EC carries out its transactions with the memory in time intervals in which there are no transactions between the CPU chipset and the memory. In the event that there are no free time intervals in which the EC can perform transactions with the memory in real time, starvation may occur. In the present context, the term "starvation" refers to various scenarios in which the EC is unable to access the memory for an extended period of time that causes performance degradation or damage to the EC or to the computer. Starvation may involve inability to fetch program code and/or data from the memory, or to store data in the memory.

EC starvation can result in performance degradation or damage to the computer. Embodiments of the present invention provide methods for detecting EC starvation and, if EC starvation exists, for mitigating the performance degradation or damage. Typically, the memory control circuitry in the EC evaluates a certain starvation condition, which identifies that the microcontroller core is unable to access the memory due to CPU memory transactions. When the condition is met, the memory control circuitry invokes an appropriate corrective action.

Several example techniques and conditions for detecting starvation by the EC are described herein below. For example, the memory control circuitry in the EC may sample the transactions on the bus interface between the EC and the memory to detect if sufficient free time intervals exist in the transactions between the CPU chipset and memory. Upon detecting starvation, the EC may perform various types of corrective actions, such as fetch an emergency program for running the EC microcontroller core, or execute a graceful or hard shutdown of the computer.

Although it is possible in principle to neglect starvation, doing so may cause the computer to malfunction under a variety of scenarios. However, when starvation detection is implemented as in the embodiments presented herein, the computer can take steps to handle the starvation, or mitigate damage to the computer that may result from starvation. The starvation detection and mitigation techniques described herein are important for ensuring reliable operation of the EC and computer and for enhancing user experience.

System Description

FIG. 1 is a block diagram that shows elements of a computer 20, in accordance with an embodiment of the present invention. Computer 20 may comprise, for example, a laptop, notebook, tablet computer, or any other suitable computer type. Elements of the computer that are not mandatory for understanding the disclosed techniques have been omitted from the figure for sake of clarity.

Computer 20 comprises a Central Process Unit (CPU) Chipset 24, for example an Intel Pentium chipset. The chipset may comprise one or more integrated circuits (ICs). Computer 20 also comprises an embedded controller (EC) 28, which carries out various system functions such as keyboard scanning, power management, battery charging, fan control and/or any other suitable function.

Both CPU chipset 24 and EC 28 share the memory resources of a memory, in the present example a Serial Peripheral Interface (SPI) Flash memory 34. Examples of SPI Flash devices are W25X16, W25X16A, W25X32 and W25X64 devices produced by Winbond Electronics Corp. (Taichung city, Taiwan). These devices are specified in "Spi-flash—16M-bit, 32M-bit and 64M-bit Serial Flash Memory with 4 KB Sectors and Dual Output SPI," revision 1, May 5, 2008, which is incorporated herein by reference. Alternatively, any other suitable memory device can be used.

If the CPU chipset performs extensive read, write, or erase operations with the Flash memory, the EC may not be able to fetch code or data from the memory at an acceptable rate needed by the EC microcontroller core to perform the critical system functions such as keyboard scanning, power management, battery charging and fan control. The EC may thus enter a starvation scenario.

In accordance with an embodiment of the present invention as shown in FIG. 1, the EC comprises an SPI bridge 38 and an EC microcontroller core 42. In some configurations, the EC microcontroller core 42 may also comprise a cache memory. Starvation logic 44, for handling the starvation scenarios, is connected to the cache memory (if implemented), EC microcontroller core 42, the control bus, and a Flash Interface 52 as described below. CPU chipset 24 communicates with EC 28 through SPI Bridge 38 over a first data bus, in the present example an SPI 46 denoted C-SPI. SPI Flash memory 34 communicates with EC 28 through SPI Bridge 38 over a second data bus, in the present example an SPI 50 denoted F-SPI. A watchdog module 53 can also be implemented for detecting starvation as described later in detail. The EC also comprises a Flash Interface 52, which identifies intervals during which no CPU chipset 24 transactions are relayed on F-SPI 50 to SPI Flash memory 34, and carries out starvation detection and mitigation techniques as described below.

SPI bridge 38 determines whether CPU chipset 24 or EC microcontroller core 42 can perform transactions with SPI Flash memory 34. In this present embodiment, there is no bus arbitration mechanism, handshake or wait states defined on the C-SPI bus, and the CPU chipset has priority in performing data transactions with SPI Flash memory 34. EC microcontroller core 42 can access SPI Flash memory 34 only during time intervals in which CPU Chipset 24 does not communicate with SPI Flash Memory 34 via SPI Bridge 38.

Flash interface 52 monitors the data traffic across the C-SPI 46 and F-SPI 50 via SPI bridge 38. In the event of a starvation scenario, EC 28 may apply various methods for mitigating the effects of starvation. In some embodiments, the EC mitigates starvation by running emergency program code that is stored in an internal emergency code memory 54, instead of fetching and running the normal program code from memory 34.

In an embodiment, the EC comprises a Read Only Memory (ROM) 58 that contains booter code for restarting EC microcontroller core 42 in the event of a shutdown. EC microcontroller core 42 may instruct EC 28 or computer 20 to shutdown using signals denoted SMI #66, EC_PWR_BTN #70 and Main System Reset 74, which are generated in a General Purpose Logic Block 62. These signals may be relayed to CPU chipset 24 over an LPC Interface 78. In some embodiments, a Second Microcontroller Core 82, which obtains program code from a second memory, maintains critical system functionality in the event of microcontroller core 42 starvation.

The configuration of EC 28 shown in FIG. 1 is an example configuration, which is chosen purely for the sake of conceptual clarity. In alternative embodiments, any other suitable EC configuration can be used. SPI bridge 38, Flash interface 52, as well as elements 53, 54, 58, 62, 78 and 82 shown in FIG. 1 are referred to collectively as memory control circuitry that carries out the techniques described herein. The functions of the various EC elements can be implemented in hardware, in software, or using a combination of hardware and software elements.

In some embodiments, certain EC functions are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Starvation Detection

The memory control circuitry in EC 28 may use various methods for detecting starvation scenarios. Typically, the memory control circuitry evaluates a certain starvation condition, which identifies that the microcontroller core is unable to access memory 34 over the F-SPI due to memory transactions between CPU chipset 24 and memory 34 over the C-SPI and F-SPI.

In some embodiments, a watchdog mechanism can be implemented in the EC using Watchdog Module 53. Watchdog module 53 monitors the progress of the software executed by microcontroller core 42, and sets a starvation flag in starvation logic 44 upon detecting a deviation from the expected progress. In an example embodiment, watchdog module 53 checks whether a specific memory address, bit or register is not accessed by microcontroller core 42 within a predetermined period of time, and sets a starvation flag when this condition is met.

In other embodiments, Flash interface 52 monitors fetch transactions between the EC microcontroller core and Flash memory 34. If there is a pending transaction from EC 28, for example a code fetch transaction, and there are no successful fetch transactions completed within a predetermined time frame, a starvation flag is set in starvation logic 44. If the microcontroller core accesses Flash memory 34 through a cache memory, the Flash interface typically monitors only "cache misses," i.e., fetch transactions that are applied to memory 34 via F-SPI 50 and not served (in an embodiment, not served at all or not served immediately) from the cache memory.

In some embodiments, the Flash interface monitors fetch transactions between the microcontroller core and Flash memory 34. If the number of successful fetch transactions during a predefined time period is less than a predetermined threshold, a starvation flag is set in the starvation logic 44. If the microcontroller core accesses Flash memory 34 through a cache memory, Flash interface 52 measures the number of successful fetch transactions, i.e., initiates the predefined time period, after a "cache miss."

Generally speaking the Flash interface may detect starvation by estimating the average length of a fetch transaction or by estimating the length of a currently-executing fetch instruction.

In some embodiments, the memory control circuitry in the EC may identify different levels of starvation, some more severe than others. Identifying the level of starvation can be implemented, for example, using any of the starvation detection methods described above or by using a combination of such methods. Each level of starvation can be indicated by a respective flag in starvation logic 44, by a value in a register in logic 44, by triggering a suitable interrupt, or using any other suitable means.

Typically, the memory control circuitry clears the starvation flag or starvation level indication when starvation no longer exists. When the memory control circuitry clears the starvation flag or the starvation level indication, the starvation condition is removed.

The starvation detection conditions described above are chosen purely by way of example. In alternative embodiments, the memory control circuitry in EC 28 may detect starvation using any other suitable method or condition.

Starvation Mitigation Techniques

Once EC starvation is detected in accordance with the embodiments of the present invention, the memory control circuitry in EC 28 may take different preset corrective actions, possibly depending on the starvation level, to mitigate performance degradation or damage to the computer. For example, when the EC controls the CPU cooling fan, EC starvation may result in a malfunction of the fan control. This malfunction may cause permanent thermal damage to the computer, unless a shutdown is implemented or starvation is removed and fan control restored.

The actions taken by the EC upon detecting starvation may range from immediate shutdown of the computer to prevent damage (with or without prior notification to the CPU chipset), graceful shutdown that is coordinated with the CPU Operating System (OS), or switching the EC to execute internally-stored emergency code. Various combinations of these methods are also possible, for example executing emergency code for a certain time period and then shutting down the computer if starvation persists.

In accordance with an embodiment of the present invention as shown in FIG. 1, EC 28 may comprise emergency code 54 stored on an internal memory device (e.g., Random Access Memory—RAM, or ROM) to be used in case of a starvation event. Unlike the normal code that is continuously fetched by EC 28 from memory 34 at run time, the emergency code is not fetched in real time from memory 34 and is therefore insensitive to starvation.

The emergency code may be pre-programmed into the internal memory device (e.g., in the case of ROM) or loaded into the device from Flash 34 during system reset that is normally controlled by the EC (e.g., in the case of RAM). EC microcontroller core 42 can execute the emergency code instead of the code that cannot be fetched from memory 34. In an example flow, core 42 aborts the current data fetch from memory 34, and saves the current state of core 42 in order to enable recovery upon removal of the starvation state.

In another embodiment, the memory control circuitry reacts to the starvation state by executing a reset and restart of EC microcontroller core 42. The EC booter code stored in Booter Code ROM 58 is then fetched and executed to restart EC microcontroller core 42. Following restart, core 42 typically starts code execution from some default address in ROM 58. If a starvation flag is set, the booter code may jump to a suitable address in the emergency code.

In some embodiments, emergency code 54 (fetched from internal memory in the EC, or previously fetched from SPI Flash Memory 34) keeps critical computer functions running. In other words, the emergency code typically has reduced functionality relative to the normal code stored in Flash 34, and its prime target is to prevent damage to the computer. As such, the memory holding the emergency code is considerably smaller than Flash 34.

In some embodiments, the emergency code contains the instructions needed for performing computer shutdown, e.g., graceful shutdown. Core 42 or core 82 may execute the emergency code (and thus shutdown), for example, when starvation is detected, when the starvation level exceeds a certain threshold, or when instructed by the CPU chipset.

When a second microcontroller core 82 is implemented, the memory control circuitry temporarily disables main EC microcontroller 42 due to the starvation state, while second microcontroller core 82 executes emergency code 54. Once the starvation flag is cleared, EC microcontroller core 42 can easily recover and continue normal operation. In these embodiments, while core 82 executed the emergency code, core 42 typically continues to wait for starvation to end and is not disabled. Thus, recovery once starvation is removed is potentially quick and straightforward in this embodiment.

In a number of embodiments, the EC responds to starvation detection by causing an immediate shutdown of the computer or a hardware shutdown after a predetermined time interval. Typically, the EC reports the detected starvation to CPU chipset 24, either immediately or after a certain time period. Shutdown may be immediate (often without cooperation of the computer's operating system) or graceful (typically coordinated with the operating system). In an alternative embodiment, the EC itself shuts-down the computer rather than invoking the CPU chipset to do so.

For example, SMI #66 and EC_PWR_BTN #70 signals generated in General Purpose Logic Block 62 may be used to initiate a hard or graceful shutdown of the computer. In one embodiment, the EC can set SMI #66 signal, which is relayed to the CPU Basic Input-Output System (BIOS—not shown in FIG. 1) to indicate an EC starvation state. The CPU BIOS can then instruct the operating system to perform a graceful shutdown by relaying a shutdown indication to the EC via LPC interface 78, or any other suitable bus between the EC and the CPU chipset such as SMBus, I2C, PECI, PCI, and PCIe, or even over C-SPI 46.

In another embodiment, the EC can use EC_PWR_BTN #70 signal (which is normally asserted when a user presses the computer power button) as a graceful power-down request signal to the CPU following an EC starvation event either immediately after starvation detection or after a predetermined delay.

(In some embodiments, main system reset signal 74, generated by the EC, is used to ensure successful initial downloading of the emergency code from the SPI Flash memory 34 to RAM 54. During the initial reset of the EC (EC Power-up reset), since the EC is responsible for system reset generation, the EC can guarantee that the system reset will end only after the emergency code is successfully downloaded from SPI Flash memory 34 to emergency code RAM 54.)

The corrective actions described above are chosen purely by way of example. In alternative embodiments, the memory control circuitry in EC 28 may perform any other suitable action in response to detecting starvation.

Figure 2:
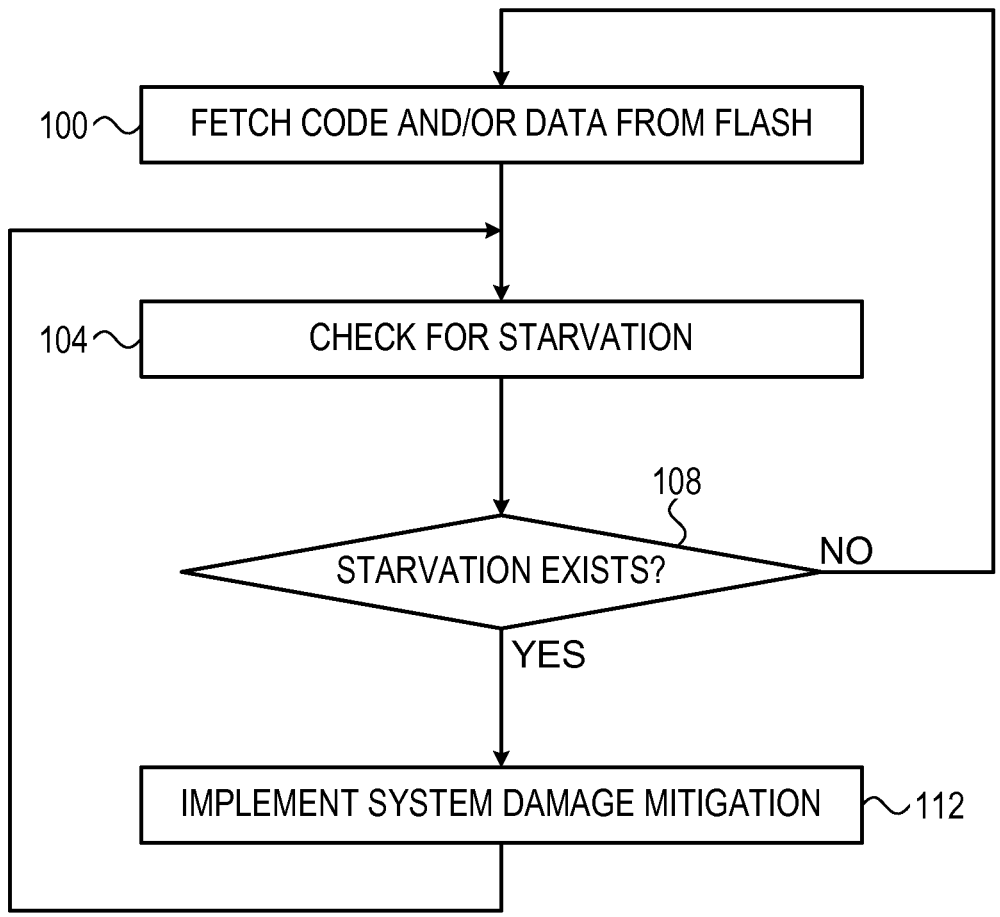
FIG. 2 is a flow chart that schematically illustrates a method for handling starvation in an embedded controller, in accordance with an embodiment of the present invention.

FIG. 2 is a flow chart that schematically illustrates the method for the detection and handling of a starvation scenario, in accordance with an embodiment of the present invention. The method begins with the memory control circuitry of EC 28 attempting to fetch program code and/or data from SPI Flash memory 34, at a fetching step 100. After attempting to fetch the code or data, the memory control circuitry of the EC checks for starvation, at a starvation detection step 104. Any starvation method can be used for this purpose, such as the embodiments previously described.

If starvation is detected, as checked at a checking step 108, the memory control circuitry mitigates possible system damage or degradation, at a starvation mitigation step 112. Any starvation mitigation technique can be used for this purpose, such as the embodiments previously described. If no starvation exists, the method loops back to step 104 above and the computer continues its normal operation.

Although the embodiments described herein mainly address handling starvation scenarios when sharing an SPI Flash memory between a CPU chipset and an EC microcontroller core, the methods and systems described herein can also be used in other applications which a Central Processing Unit (CPU) chipset and an embedded controller share a Flash memory, whereas the CPU chipset dominantly communicates with the Flash memory without any bus arbitration. Moreover, the disclosed techniques are not limited to use in ECs of notebook computers. In alternative embodiments, the disclosed techniques can be used in other types of embedded controllers such as in Super I/O devices in desktop computers and in Baseboard Management Controllers (BMC) in servers. All of these devices are regarded herein as types of embedded controllers.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An embedded controller, comprising:
a microcontroller core;
a first bus interface, which is configured to receive and transmit memory transactions from and to a Central Processing Unit (CPU) chipset and does not support bus arbitration;
a second bus interface, which is configured to communicate with a memory and to transfer the memory transactions of the CPU chipset to and from the memory; and
memory control circuitry, which is configured to evaluate a starvation condition that identifies an inability of the microcontroller core to access the memory via the second bus interface due to the memory transactions transferred between the CPU chipset and the memory via the first and second bus interfaces, and to invoke a predefined corrective action when the starvation condition is met.

2. The embedded controller according to claim 1, wherein the memory control circuitry is configured to evaluate the starvation condition by detecting that no successful fetch transactions occur between the microcontroller core and the memory within a predetermined time period.

3. The embedded controller according to claim 1, wherein the memory control circuitry is configured to evaluate the starvation condition by detecting that a number of successful fetch transactions, initiated by the EC microcontroller core via the second bus interface to the memory, is below a predetermined threshold.

4. The embedded controller according to claim 1, wherein the memory control circuitry is configured to evaluate the starvation condition by detecting that the microcontroller core fails to access the memory within a predetermined time period.

5. The embedded controller according to claim 1, wherein the memory control circuitry is configured to evaluate the starvation condition by estimating an average length of fetch transactions between the microcontroller core and the memory.

6. The embedded controller according to claim 1, and comprising a watchdog circuit that is configured to monitor an expected progress of software executed by the microcontroller core, wherein the memory control circuitry is configured to evaluate the starvation condition by detecting a deviation from the expected progress using the watchdog circuit.

7. The embedded controller according to claim 1, wherein the microcontroller core comprises a cache memory for caching memory access operations between the microcontroller core and the memory, and wherein the memory control circuitry is configured to evaluate the starvation condition based only on the memory access operations that are not served from the cache memory.

8. The embedded controller according to claim 1, wherein the memory control circuitry is configured to assign to the inability of the microcontroller core to access the memory a starvation severity level, selected from a set of multiple different severity levels, and to invoke the predefined corrective action depending on the assigned starvation severity level.

9. The embedded controller according to claim 1, wherein the memory control circuitry is configured to invoke the corrective action by initiating a shut-down of a computer comprising the embedded controller and the CPU chipset.

10. The embedded controller according to claim 9, wherein the memory control circuitry is configured to initiate the shut-down of the computer without prior notification to the CPU chipset.

11. The embedded controller according to claim 9, wherein the memory control circuitry is configured to request software running on a CPU of the computer to shut-down the computer.

12. The embedded controller according to claim 1, wherein the microcontroller core is configured to invoke the corrective action by switching to run the embedded controller using emergency software code that is not fetched in real time from the memory over the second bus interface.

13. The embedded controller according to claim 12, and comprising an additional microcontroller core that is configured to execute the emergency software code in response to detection of the starvation condition.

14. A method, comprising:
in an embedded controller, receiving and transmitting memory transactions from and to a Central Processing Unit (CPU) chipset over a first bus interface that does not support bus arbitration, and communicating with a memory and transferring the memory transactions of the CPU chipset to and from the memory over a second bus interface;
evaluating a starvation condition that identifies an inability of the embedded controller to access the memory via the second bus interface due to the memory transactions transferred between the CPU chipset and the memory via the first and second bus interfaces; and
invoking a predefined corrective action when the starvation condition is met.

15. The method according to claim 14, wherein evaluating the starvation condition comprises detecting that no successful fetch transactions occur between the embedded controller and the memory within a predetermined time period.

16. The method according to claim 14, wherein evaluating the starvation condition comprises detecting that a number of successful fetch transactions, initiated by the embedded controller to the memory over the second bus interface, is below a predetermined threshold.

17. The method according to claim 14, wherein evaluating the starvation condition comprises detecting that the embedded controller fails to access the memory within a predetermined time period.

18. The method according to claim 14, wherein evaluating the starvation condition comprises estimating an average length of fetch transactions between the embedded controller and the memory.

19. The method according to claim 14, wherein evaluating the starvation condition comprises detecting a deviation from an expected progress of software executed by the embedded controller, using a watchdog circuit that monitors the expected progress of the software.

20. The method according to claim 14, wherein the embedded controller comprises a cache memory for caching memory access operations between the embedded controller and the memory, and wherein evaluating the starvation condition comprises assessing the starvation condition based only on the memory access operations that are not served from the cache memory.

21. The method according to claim 14, wherein evaluating the starvation condition comprises assigning to the inability of the embedded controller to access the memory a starvation severity level, selected from a set of multiple different severity levels, and wherein invoking the predefined corrective action comprises selecting the corrective action depending on the assigned starvation severity level.

22. The method according to claim 14, wherein invoking the corrective action comprises initiating a shut-down of a computer that comprises the embedded controller and the CPU chipset.

23. The method according to claim 22, wherein initiating the shut-down comprises shutting-down the computer without prior notification to the CPU chipset.

24. The method according to claim 22, wherein initiating the shut-down comprises requesting software running on a CPU of the computer to shut-down the computer.

25. The method according to claim 14, wherein invoking the corrective action comprises switching to run the embedded controller using emergency software code that is not fetched in real time from the memory over the second bus interface.

26. The method according to claim 25, wherein the embedded controller comprises a microcontroller core that runs software code when the starvation condition is not met, and wherein invoking the corrective action comprises causing an additional microcontroller core in the embedded controller to execute the emergency software code upon meeting the starvation condition.

27. A computer, comprising:
 a Central Processing Unit (CPU) chipset;
 a memory; and
 an embedded controller, comprising:
  a microcontroller core;
  a first bus interface, which is configured to receive and transmit memory transactions from and to the CPU chipset and does not support bus arbitration;
  a second bus interface, which is configured to communicate with the memory and to transfer the memory transactions of the CPU chipset to and from the memory; and
 memory control circuitry, which is configured to evaluate a starvation condition that identifies an inability of the microcontroller core to access the memory via the second bus interface due to the memory transactions transferred between the CPU chipset and the memory via the first and second bus interfaces, and to invoke a predefined corrective action when the starvation condition is met.

* * * * *